United States Patent

Takahashi et al.

[11] Patent Number: 5,807,934
[45] Date of Patent: *Sep. 15, 1998

[54] METHOD OF REMOVING FOAM DURING POLYMERIZATION OF VINYL CHLORIDE POLYMERS

[75] Inventors: Yasuhiro Takahashi; Takashi Kobayashi, both of Ibaraki-ken; Hitoshi Nakajima, Annaka; Genji Noguki; Yoshitaka Okuno, both of Ibaraki-ken, all of Japan

[73] Assignee: Shin-Etsu Chemical Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 708,720

[22] Filed: Sep. 5, 1996

[30] Foreign Application Priority Data

Sep. 19, 1995 [JP] Japan .................................... 7-264929
Oct. 18, 1995 [JP] Japan .................................... 7-294785
Oct. 18, 1995 [JP] Japan .................................... 7-294786

[51] Int. Cl.$^6$ .................................................... C08F 2/18
[52] U.S. Cl. .......................................... 526/88; 526/344.2
[58] Field of Search ................................ 526/68, 67, 72, 526/88, 344.2

[56] References Cited

U.S. PATENT DOCUMENTS 5,444,130 8/1995 Ohnishi ...................................... 526/67

FOREIGN PATENT DOCUMENTS 1249813 10/1989 Japan .

Primary Examiner—Christopher Henderson
Attorney, Agent, or Firm—Oblon, Spivak, McClelland, Maier & Neustadt, P.C.

[57] ABSTRACT

The present invention provides a method of producing vinyl chloride polymers, including the steps of subjecting vinyl chloride monomer or a mixture of monomers containing vinyl chloride monomer to suspension polymerization reaction in an aqueous medium within a polymerization vessel equipped with a reflux condenser, and subsequently, after the completion of the polymerization reaction, recovering any unreacted monomer, wherein foam generated on the surface of the liquid phase inside the polymerization vessel is eliminated by discharging a high pressure water having a pressure of 20 kg/cm$^2$ or more substantially linearly to the surface of the liquid phase. The high pressure water discharging is carried out at the polymerization step, particularly from the time when operation of the reflux condenser begins, and/or at the recovery step. A vinyl chloride polymer is thus obtained without the splashing of foam over the gaseous phase section of the polymerization vessel, regardless of whether the heat removal rate of the reflux condenser, or the recovery rate per unit time for the unreacted monomer are increased.

17 Claims, 6 Drawing Sheets

METHOD OF REMOVING FOAM DURING POLYMERIZATION OF VINYL CHLORIDE POLYMERS

BACKGROUND OF THE INVENTION

1. Field of the Invention

The present invention relates to a method for producing vinyl chloride polymers.

2. Description of the Prior Art

Utilizing the currently available methods of producing vinyl chloride polymers, tests have been conducted on removing the heat generated at the polymerization reaction to reduce the polymerization time, in an attempt to improve efficiency of production of the polymer. Known methods for removal of this heat of reaction rely on the use of cooling jackets, cooling baffles, and a reflux condenser fitted inside the polymerization vessel. Of these methods, the use of a reflux condenser is favorable in as far as it ensures a large heat transmission surface area without affecting the stirring and mixing of a content (reaction mass) in the polymerization vessel. However, with this reflux condenser method, if the amount of heat to be removed is large, a marked amount of the monomer in the content inside the polymerization vessel vaporizes, forming a layer of gaseous monomer-containing foam on the surface of the content. Furthermore, as this foam includes low density polymers, if large amounts of foam are generated, it can cause a build up of scale in the gaseous phase section of the polymerization vessel. A further problem arises due to the fact that this foam is splashed over the inside of the polymerization vessel, and can generate scale in areas which are difficult to clean by standard cleaning operations, such as on the very inside of the reflux condenser. The scale thus generated becomes mixed with the polymer being produced, generating the problem of fish eyes appearing on products formed from the polymer. Consequently, with the reflux condenser method, it is necessary to first remove the foam generated inside the polymerization vessel in order to reduce the polymerization time.

On the other hand, in addition to the above methods which rely on shortening the polymerization time, there have also been tests done on improving the efficiency of production of the polymer by shortening the polymerization cycle. An example of a method for reducing the polymerization cycle involves reducing the time spent recovering unreacted monomer. However this method, when the amount of unreacted monomer to be recovered in a specified time period is increased, generates the same problems as the previously mentioned reflux condenser method, as it too results in the generation of large amounts of foam in the polymerization vessel. Furthermore it suffers from an additional problem in that the foam can clog the monomer recovery line.

In order to effect the removal of the foam from the gaseous phase section of the polymerization vessel, methods involving stirring the gaseous phase section of the polymerization vessel with a rotary vane (refer to Japanese Patent Publication (Kokoku) No. 60-42804), and methods involving spraying either water, or an aqueous solution of a foam inhibitor, with a spray nozzle such as a flat nozzle or a full cone nozzle have been proposed.(refer to Japanese Patent Publication (Kokoku) No. 50-30106) However, the former method, although it has the effect of breaking up the foam, still results in the splashing of spray, which includes some of the polymer, over the inside of the polymerization vessel, and as such does not solve the fundamental problem of preventing scale, and allowing production of a high quality polymer. Furthermore, the latter method although resulting in some inhibition of foam formation, still displays insufficient foam breaking effect.

SUMMARY OF THE INVENTION

It is an object of the present invention to provide a method of producing vinyl chloride polymers, where production of the vinyl chloride polymer is carried out using a polymerization vessel equipped with a reflux condenser, and where foam is not splashed over the gaseous phase section of the polymerization vessel at polymerization, nor at recovery of the unreacted monomer, regardless of whether the amount of heat to be removed by the reflux condenser is increased, and regardless of whether the amount of unreacted monomer to be recovered is increased, thus resulting in a high yield of a high quality vinyl chloride polymer.

The inventors have developed this invention when, in an attempt to remove the layer of foam covering the surface of the content (liquid phase) in the polymerization vessel, they discharged high pressure water linearly to the surface of the liquid phase, and noted that not only did the discharged water penetrate the foam layer, reaching the liquid phase underneath, where the discharged water caused vibration of the surface of the liquid phase allowing for simpler destruction of the foam bridging, but also that the discharged water facilitated foam-breaking by diluting and reducing the concentration of low density polymers contained in the foam around the place where the discharged water penetrated, and by providing a path through the foam for the gaseous monomer trapped in the foam to escape.

The present invention provides a method of producing vinyl chloride polymers, which comprises the steps of subjecting vinyl chloride monomer or a mixture of monomers containing vinyl chloride monomer to suspension polymerization reaction in an aqueous medium in the presence of a suspending agent within a polymerization vessel equipped with a reflux condenser, and subsequently, after the completion of the polymerization reaction, recovering unreacted monomer, said method comprising discharging a high pressure water having a pressure of 20 kg/cm$^2$ or more substantially linearly to the surface of a liquid phase inside the polymerization vessel from a nozzle provided in a gaseous phase section of the polymerization vessel at said polymerization step, at said recovery step or at both these steps, whereby foam generated on the surface of the liquid phase is eliminated.

The high pressure water discharging of this invention is preferably carried out at operation of the reflux condenser in the polymerization step, and at the monomer recovery step.

With the method of producing vinyl chloride polymers according to the present invention, the production of the vinyl chloride polymer is carried out using a polymerization vessel equipped with a reflux condenser, and foam is not splashed over the gaseous phase section of the polymerization vessel at polymerization, nor at recovery of the unreacted monomer, regardless of whether the amount of heat to be removed by the reflux condenser is increased, and regardless of whether the amount of unreacted monomer to be recovered is increased, and consequently a high quality vinyl chloride polymer with few fish eyes or other imperfections can be produced at a good level of productivity by appropriate reduction in the polymerization time and the polymerization cycle. These effects are most pronounced if the high pressure water is discharged at operation of the reflux condenser in the polymerization step, and at the recovery step.

DESCRIPTION OF THE PREFERRED EMBODIMENTS

The present invention is described in more detail below.

The water pressure of the high pressure water used in the production method of this invention should be 20 kg/cm$^2$ or more (all pressures refer to the gauge pressure in piping attached to the nozzle), with 20–500 kg/cm$^2$ being preferable, 30–300 kg/cm$^2$ being even more preferable, 50–200 kg/cm$^2$ being even more preferable again, and 80–150 kg/cm$^2$ being the most preferred. If the pressure is too low, then the foam breaking effect can be insufficient, while if too high, the discharged water turns to a mist and the linearity of the discharged water deteriorates, resulting in an insufficient foam breaking effect.

Figure 7:
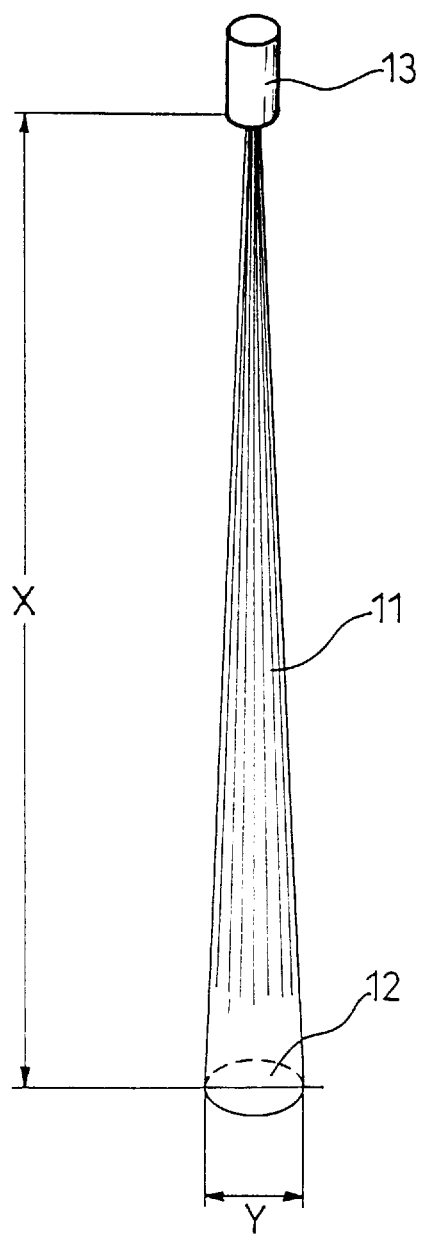
FIG. 7 is a schematic diagram of a discharge pattern resulting from the discharging of high pressure water through a nozzle under atmospheric conditions, used for explaining the linearity of the discharged water.

The nozzle capable of linearly discharging a high pressure water (hereafter referred to as the linearly discharging nozzle) used in the present invention can be any nozzle which will produce a discharged water with good linearity when high pressure water is discharged therethrough. With reference to, for example, the numerals in FIG. 7, good linearity here refers to a nozzle 13, which satisfies the requirement that, when high pressure water is discharged through the nozzle 13 under atmospheric conditions, the ratio (Y/X) of the diameter Y of the discharge circle 12 to the distance X discharged, of the discharged water 11, is 0.15 or less, with 0.1 or less being preferable. In these situations an X value of between 100 cm and 200 cm is preferable.

For the linearly discharging nozzle used in the present invention, an orifice diameter of 0.5–7.0 mm is preferable, with 1.0–5.0 mm being even more preferable. If this orifice diameter is too small, the volume of water to be discharged decreases, resulting in a fall in the kinetic energy of the discharged water. If the discharge pressure is then increased to try and increase the volume of water to be discharged, the discharged water turns to a mist which is undesirable. In contrast, if the orifice diameter is too large, then as there is a limit to the total volume of water which can be discharged into the polymerization vessel, it may be necessary to reduce the discharge pressure, which will result in an undesirable lowering of the foam breaking effect.

Figure 4:
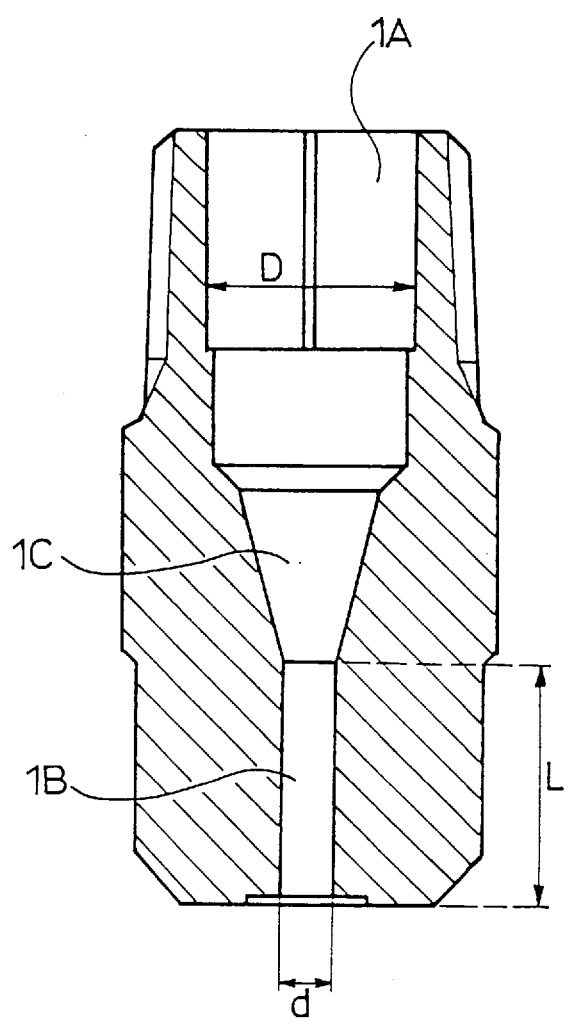
FIG. 4 is a cross-sectional view showing an example of a nozzle linearly discharging high pressure water for use with the present invention.

Particularly suitable examples of these linearly discharging nozzles are the type of nozzle shown in FIG. 4. This linearly discharging nozzle consists of a substantially cylindrical water-inlet portion 1A, and a discharge portion 1B with an internal diameter d (in this nozzle, equivalent to the orifice diameter) smaller than that of a water inlet portion D (hereafter referred to as the nozzle internal diameter), connected by a tapered portion 1C. Linearly discharging nozzles where the ratio (L/d) of the length L of the discharge portion 1B to the internal diameter d of the same dischage portion is between 1.0 and 10.0 are particularly preferable. If this ratio is too small, then the linearity of the discharged water may deteriorate. In contrast, if the ratio is too large, the pressure loss in the nozzle may increase significantly. Furthermore, if the length L of the dischage portion 1B is too long (when the L/d ratio is too large), then it becomes difficult to polish the internal surface of the dischage portion 1B, meaning distortions remain, and a smooth surface can not be produced.

Linearly discharging nozzles in which the internal surfaces have been polished and smoothed in order to lower frictional resistance are most preferable. The tapered portion 1C has the effect of lowering the amount of pressure loss in the nozzle, as well as preventing turbulence in the water flow inside the nozzle.

With the linearly discharging nozzles used in the present invention, straighteners such as discharge stabilizers may be connected to the water inlet portion 1A. Fitting the linearly discharging nozzle with this type of straightener allows continual straightening of the water flowing through the nozzle, resulting in a further improvement in the linearity of the discharged water. Although there are no particular restrictions on the materials used in the linearly discharging nozzle, materials with good abrasion resistance properties such as stainless steel are preferable.

For the production method outlined in the present invention, a linearly discharging nozzle which will produce a discharged water with good linearity must be used, as the nozzles employed in currently used methods such as full cone nozzles, flat nozzles and hollow cone nozzles, will not generate a discharged water with sufficient linearity. Furthermore, in highly dense atmospheres which contain large amounts of gaseous monomer, such as the atmosphere in the gaseous phase section inside a polymerization vessel, energy dispersion of the dischaged water from currently employed nozzles is large, and consequently, the discharged water cannot penetrate the foam layer right through to the liquid phase, and thus generates an insufficient foam-breaking effect.

The linearly discharging nozzle may be located at any point in the gaseous phase section of the polymerization vessel which allows water to be discharged onto the foam layer which develops. However, the preferred location is at a position where it will not interfere with other devices located in the gaseous phase section of the polymerization vessel for supplying additives into the polymerization vessel.

Figure 5:
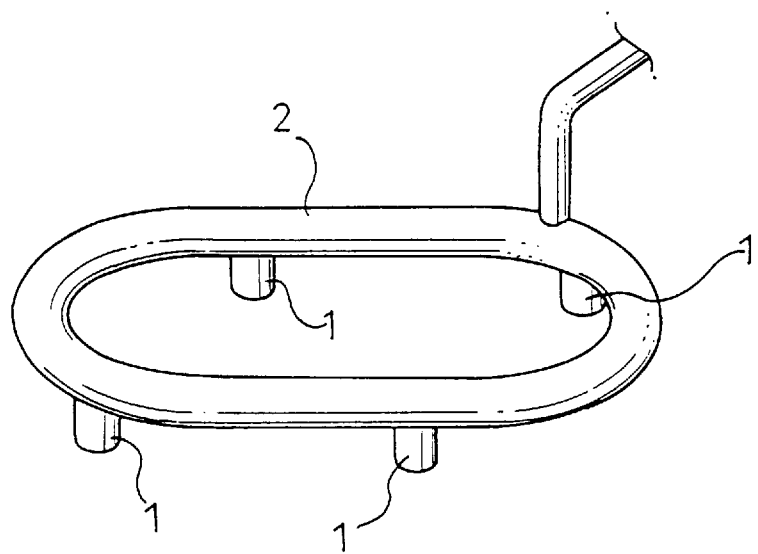
FIG. 5 is a schematic diagram showing an example of a piping arrangement of nozzles linearly discharging high pressure water for use with the present invention.
Figure 6:
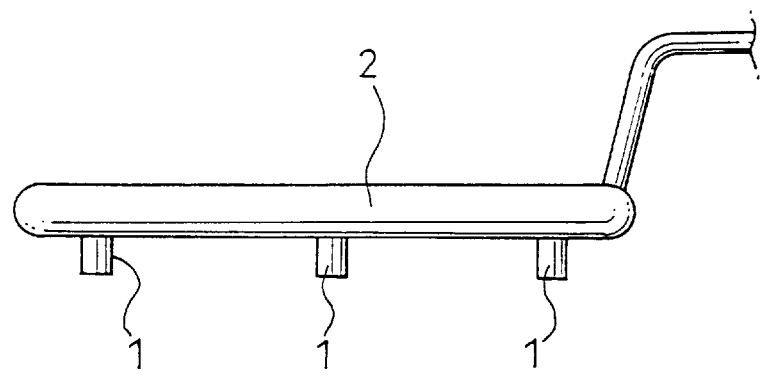
FIG. 6 is a schematic diagram showing an example of another piping arrangement of nozzles linearly discharging high pressure water for use with the present invention.

The number of linearly discharging nozzles located in the polymerization vessel can be determined relative to the total volume of water which can be discharged into the polymerization vessel. The total allowable volume of water to be discharged can be calculated from the volume of water discharged (the volume of the discharged water per hour) and the discharging time per linearly discharging nozzle when the nozzle was operated at a water pressure sufficient to allow the discharged water to penetrate the foam layer right through to the liquid phase beneath. Specifically, for polymerization vessels with, for example, volumes between 40 and 300 m$^3$, normally 1–6 nozzles will generate sufficient foam-breaking effect. Furthermore, multiple linearly discharging nozzles may be fitted to a piping arrangement, such as in FIG. 5, where linearly discharging nozzles 1 are attached to a ring-shaped piping 2, or as in FIG. 6, where linearly discharging nozzles 1 are attached to a rod-shaped piping 2.

The upper limit for the total volume of water to be discharged can be set at a value which maintains the capacity of the gaseous phase section of the polymerization vessel at a value of 10% or more of the total volume of the polymerization vessel. Polymerization vessels with volumes of 40 m³ or more are preferred, with volumes of 80 m³ or more being even more preferable. If water is discharged into the vessel until the volume of the gaseous phase section is less than 10%, the distance between the linearly discharging nozzles and the upper surface of the foam layer becomes too small and can generate problems. For example, there are instances where if the foam layer is very thin, the foam cannot be broken up, even if the water pressure or the volume of water to be discharged is increased. In these instances if the distance between the linearly discharging nozzles and the upper surface of the foam layer becomes too small, then the situation can arise that by the time the foam layer reaches a thickness which can be broken up, the linearly discharging nozzles have already been engulfed in the foam layer. If the linearly discharging nozzles become engulfed by the foam layer in this way, the foam breaking effect diminishes markedly. Consequently due consideration must be given to the total volume of water to be discharged.

The flow rate of water to be discharged from each linearly discharging nozzle is determined by the pressure of the high pressure water to be discharged and said orifice diameter, and so provided the linearly discharging nozzle orifice diameter falls within the range mentioned above, the pressure is first fixed within the above mentioned range, and a linearly discharging nozzle then chosen with an orifice diameter sufficient to allow linear-discharging of water at that pressure. For discharge pressures of 20–500 kg/m³, the flow rate is generally 1–100 liters/minute, with 3–50 liters/minute being preferable.

With the production method of the present invention, high pressure water is discharged substantially linearly from the linearly discharging nozzles mentioned above, to the surface of the liquid phase in the polymerization vessel, at the polymerization step, at the unreacted monomer recovering step, or at both these steps.

In those instances where the high pressure water discharging is carried out at the polymerization step, it can be carried out, without any particular restrictions, at any time from the point of polymerization initiation, until the completion of polymerization. However, as there is a tendency for foam generation to increase markedly following commencement of heat removal with the reflux condenser, it is preferable to continue the high pressure water discharging from the time when heat removal using the reflux condenser is begun, until the completion of polymerization. Heat removal using the reflux condenser is preferably carried out from the point where the content inside the polymerization vessel reaches the polymerization temperature, until the polymerization reaction is complete.

There are no restrictions on when, at the unreacted monomer recovery step, the high pressure water discharging should be carried out, with the time period from the point of monomer recovery initiation, until the completion of the recovery step being suitable.

Figure 2:
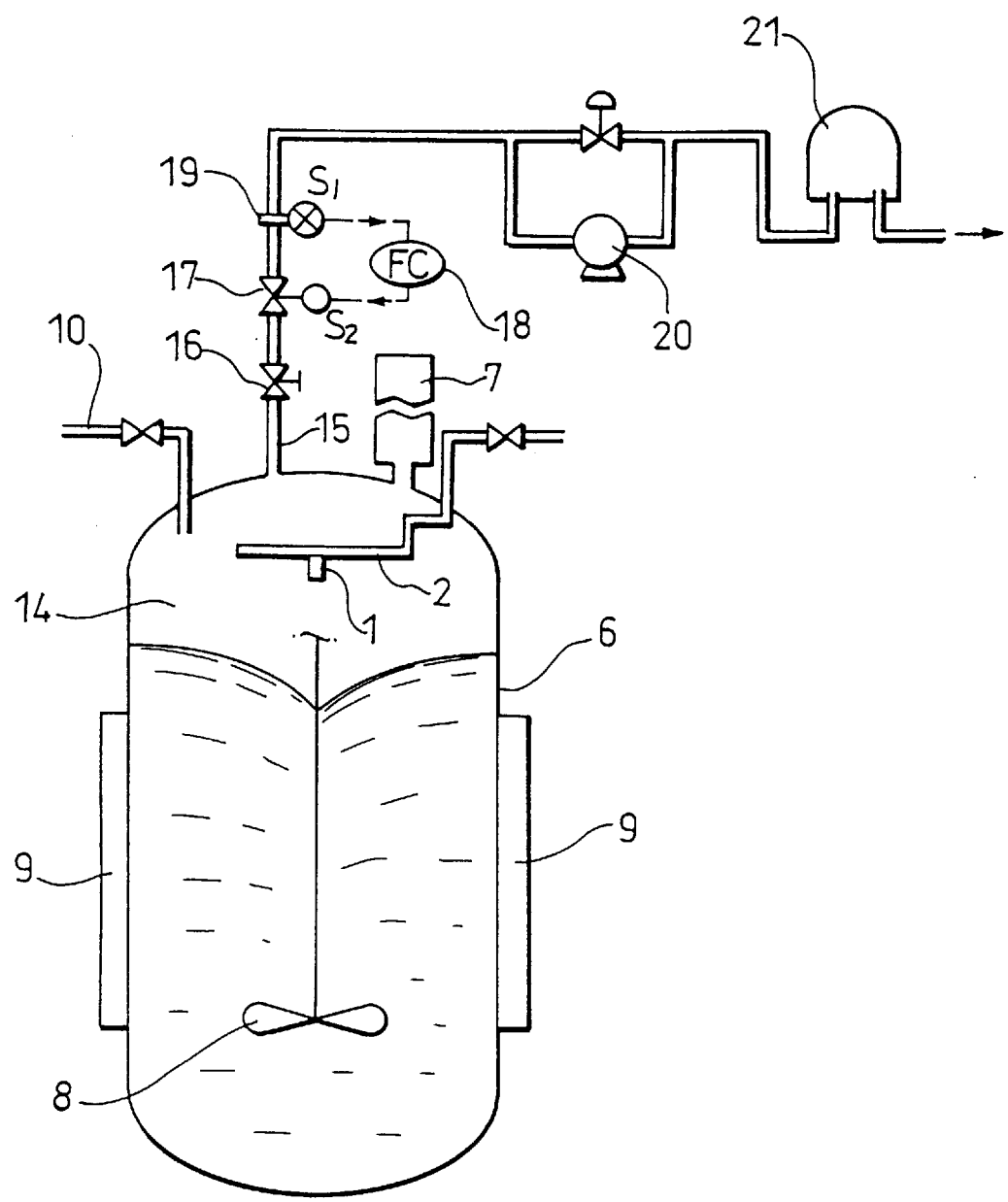
FIG. 2 is a schematic diagram showing a cross-section of another example apparatus for use with the present invention.

Methods for recovery of the unreacted (gaseous) monomer from the polymerization vessel include the widely employed method shown in, for example, FIG. 2, where the unreacted monomer is recovered via an unreacted monomer recovery piping arrangement 15 located at the top of a polymerization vessel 6. With this method, firstly a sequence valve 16 fitted part way along the recovery piping 15 is opened, and the flow rate of the gaseous monomer through the recovery piping 15 measured with a flow rate meter 19. The measured flow rate $S_1$ from the flow rate meter 19 is then transmitted to a flow rate controller 18, and this controller 18, in order to effect an adjustment in the flow rate to a pre-set value, then transmits a flow rate adjustment signal $S_2$ to a flow rate control valve 17. The flow rate control valve 17 then adjusts the flow rate of the gaseous monomer in the recovery piping 15 to the pre-set flow rate. The value of the pre-set flow rate stored in the controller 18, is a value, obtained by experimentation, which will not generate splashing of the product polymer over the gaseous phase section 14 of the polymerization vessel. The gaseous monomer thus recovered, passes through a gas holder 21 fitted to an extension of the recovery piping 15, and is then transferred to a compressor to complete the recovery step. If required, an unreacted monomer recovery blower 20 can be fitted to the recovery piping 15, at a point between the flow rate meter 19 and the gas holder 21, and this blower then used to effect vacuum recovery of the gaseous monomer. This type of vacuum recovery enables a large reduction in the amount of residual unreacted monomer contained in the product polymer (typically 0.1–1% of the polymer). Normally, recovery conditions where the unreacted gaseous monomer is recovered at a space linear velocity (the linear velocity at which the unreacted gaseous monomer rises up the straight cylindrical portion of the polymerization vessel) of 0.01–1 m/sec are preferable. Recovery times cannot be fixed unconditionally as they will vary with, among other things, the size of the device and the amount of polymer splashing which occurs in the gaseous phase section of the polymerization vessel, but generally recovery times of between 15 and 120 minutes are sufficient. From a production efficiency viewpoint, the faster the recovery rate and the shorter the recovery time the better, providing there is no splashing of the polymer in the gaseous phase section of the polymerization vessel.

In those instances where the high pressure water discharging is carried out at the unreacted monomer recovery step in accordance with the present invention, the recovery rate of the unreacted monomer is preferably 40 Nm³/min or more, and particularly 50 Nm³/min or more, whereby splashing of foam over the inner wall of the gaseous phase section of a polymerization vessel and the inside of a reflux condenser and into the recovery line of the unreacted monomer can be effectively prevented.

With the present invention, the high pressure water discharging is preferably carried out at both the polymerization step and the recovery step. As described above, the high pressure water discharging at the polymerization step is preferably carried out at operation of the reflux condenser. That is, with the present invention, the high pressure water discharging is best carried out at operation of the reflux condenser and at the recovery step of the unreacted monomer. Specifically, this means that discharging could be carried out both during the whole period of reflux condenser operation and during the whole unreacted monomer recovery step; both during part of the period of reflux condenser operation and during the whole unreacted monomer recovery step; both during the whole period of reflux condenser operation and during part of the unreacted monomer recovery step; or both during part of the period of reflux condenser operation and during part of the unreacted monomer recovery step.

Regardless of at which step discharging is conducted, provided it is carried out at the discharging times mentioned above, the high pressure water discharging can be carried out either continuously, with no interruption from the beginning of discharging until its completion (continuous discharging), or alternatively, as intermittent discharging, with the discharging being started, interrupted at some point, and then recommenced. Multiple interruptions in the discharging sequence are also possible.

Regardless of whether the high pressure water discharging is to be carried out at the polymerization step or the unreacted monomer recovery step, it is preferable to commence discharging once confirmation is obtained of foam generation inside the polymerization vessel. Methods for confirming foam generation inside the polymerization vessel include, for example, confirmation via a foam sensor located in the gaseous phase section of the polymerization vessel; and confirmation by use of a simple foam sampling pipe, consisting of a pipe with one end inside the gaseous phase section of the polymerization vessel, the other end outside the vessel and containing an open-close valve and a sight glass, where confirmation is carried out by opening the valve, and then checking, via the sight glass, whether or not foam is being forced up into the pipe from the gaseous phase section of the polymerization vessel.

Examples of the foam sensor mentioned above, include electrostatic capacity sensors, ultra sound sensors, radiation sensors, infrared sensors, and conductivity cells.

These type of foam sensors can be installed at any position which takes into consideration the velocity with which the foam layer moves up the inside of the polymerization vessel, although they should preferably be installed at a point at least 10 vertical cm below the outlet of the linearly discharging nozzle. Furthermore, if two or more foam sensors are installed, the vertical distance between individual sensor locations should preferably be 10 cm or more.

Figure 3:
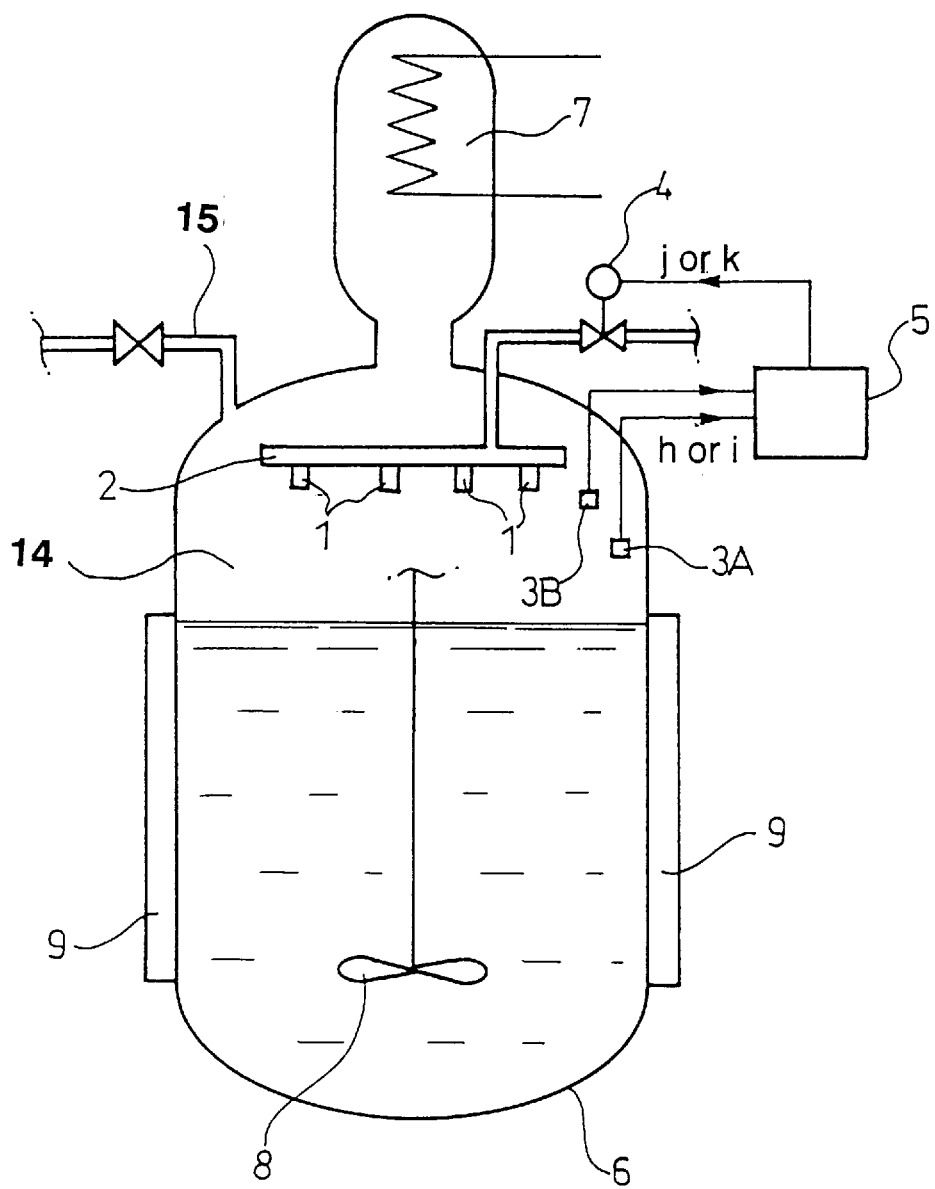
FIG. 3 is a schematic diagram showing a cross-section of yet another example apparatus for use with the present invention.

An example of an apparatus which uses this type of foam sensor to confirm foam generation, and which discharges high pressure water from linearly discharging nozzles is shown in, for example, FIG. 3. This apparatus comprises: foam sensors 3A, 3B located in a gaseous phase section 14 of a polymerization vessel 6, linearly discharging nozzles 1, piping 2 for supplying high pressure water to the linearly discharging nozzles 1, a solenoid valve 4 for adjusting the flow rate of high pressure water in the piping 2, and a valve opening controller 5 (for example, a CPU) for controlling the opening and closing of the solenoid valve 4. With this type of apparatus, when a foam layer is formed either at the time of operation of the reflux condenser or at the unreacted monomer recovery step, and the upper surface of that foam layer starts rising up the interior of the polymerization vessel 6, the foam is detected by the foam sensors (3A, 3B) which then transmit a foam detection signal h to the valve opening controller 5. The valve opening controller 5, on receipt of this foam detection signal h, transmits a valve opening signal j to the solenoid valve 4. The solenoid valve 4 then lets water flow through the piping 2, in accordance with the valve opening signal j, and high pressure water is discharged out through the nozzles 1. The foam generated inside the polymerization vessel 6 is broken down by the linear discharge of high pressure water, and the upper surface of the foam layer drops back down the inside of the vessel 6. At this point, the foam sensors (3A, 3B) detect the falling of the upper surface of foam layer, and transmit a loss of foam detection signal i to the valve opening controller 5. The valve opening controller 5, on receipt of this loss of foam detection signal i, transmits a valve closing signal k to the solenoid valve 4, and the solenoid valve 4 then closes the valve in accordance with this signal k, and the discharging of high pressure water from the linearly discharging nozzles 1 is interrupted. When the upper surface of the foam layer starts rising up the interior of the polymerization vessel 6 again, the cycle consisting of the high pressure water discharging and the discharging interruption, as described above, is repeated.

With the production method outlined in the present invention, if the high pressure water discharging is conducted only at the polymerization step, or alternatively only at the monomer recovery step, then either the polymerization step is preferably carried out in the presence of an anti-foaming agent, or the unreacted monomer recovery step is preferably carried out in the state of an anti-foaming agent being present in the content of the polymerization vessel. Of course, such anti-foaming agents can also be used when the high pressure water discharging is conducted at both the polymerization and monomer recovery steps.

When the polymerization is carried out in the presence of an anti-foaming agent, the only requirement is that the agent is present in the content of the polymerization vessel at the time of polymerization. Thus, the anti-foaming agent may be placed in the polymerization vessel before the polymerization reaction, or alternatively, introduced into the polymerization vessel between the time of polymerization initiation and the time of polymerization completion. It is particularly preferable to conduct this introduction between commencement of heat removal using the reflux condenser and completion of polymerization.

Furthermore, when the unreacted monomer recovery is carried out in the state of an anti-foaming agent being present in the content inside the polymerization vessel, the only requirement is that the agent is present in the content in the vessel at the time of recovery. The anti-foaming agent may be placed in the polymerization vessel before initiation of the polymerization reaction, introduced into the polymerization vessel between the time of polymerization initiation and the time of polymerization completion, or alternatively, introduced into the polymerization vessel between the time of initiation of the recovery of unreacted monomer and the time of completion of this monomer recovery. It is particularly preferable to conduct this introduction at the period between commencement of unreacted monomer recovery and completion of this recovery.

Figure 1:
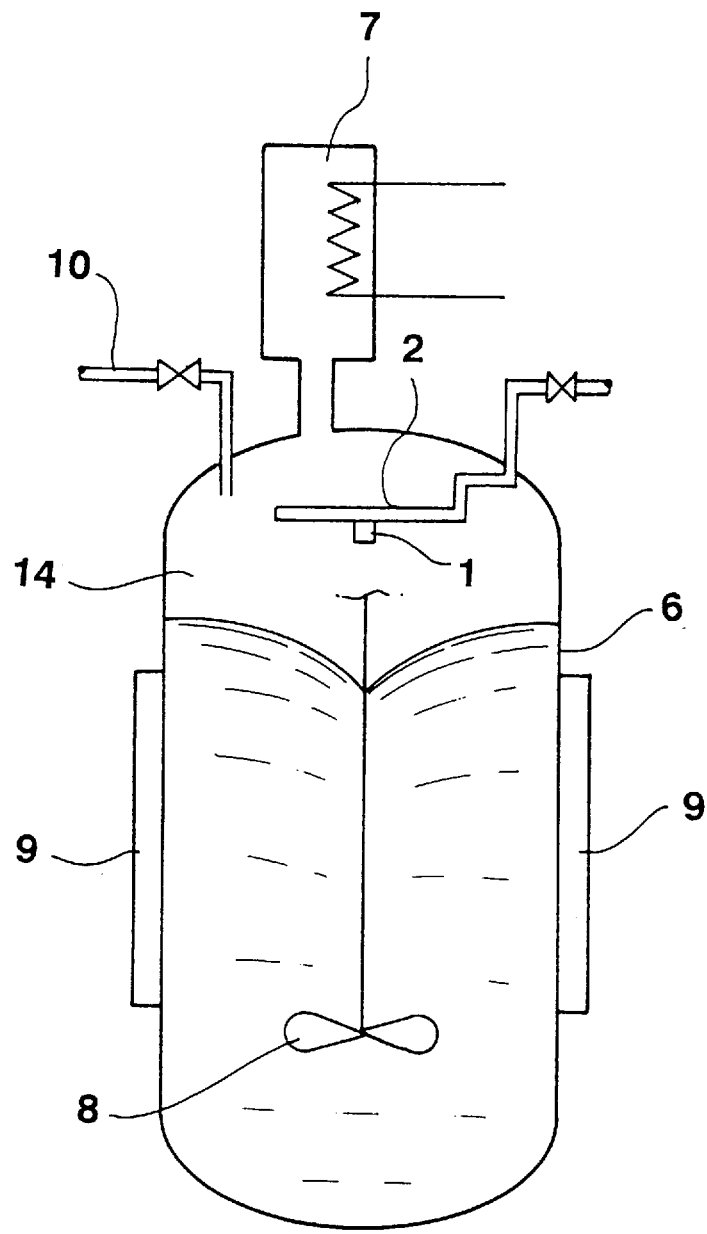
FIG. 1 is a schematic diagram showing a cross-section of an example apparatus for use with the present invention.

Examples of methods for introducing an anti-foaming agent into the polymerization vessel include; placing the anti-foaming agent, together with deionized water, in the polymerization vessel prior to the polymerization step; using high pressure water which contains an anti-foaming agent; and introduction of the anti-foaming agent into the polymerization vessel through a separate anti-foaming agent addition pipe 10, comprising a pipe fitted with an open-close valve, one end of which opens inside the gaseous phase section 14 of the polymerization vessel 6, and the other end of which remains outside the vessel 6, as shown in, for example, FIGS. 1 and 2. The anti-foaming agent can either be introduced into the polymerization vessel without any addition of the agent to the high pressure water, by either placing the agent in the polymerization vessel prior to reaction, or adding it to the vessel via the separate addition pipe, or alternatively it can be introduced by both methods, so that it is placed in the polymerization vessel prior to reaction or added via the separate addition pipe, in addition to being added with the high pressure water. Furthermore, in those instances where the anti-foaming agent is added via the separate addition pipe described above, the addition can be carried out either continuously or intermittently.

Examples of the anti-foaming agents discussed above include widely used foam inhibiting agents and foam breaking agents such as silicones such as organopolysiloxane, alcohols such as methyl alcohol, ethyl alcohol, octyl alcohol, and acetylene alcohol, and nonionic surface active agents such as Span (tradename of sorbitan fatty acid ester-based nonionic surface active agent) and polyether.

The amount of anti-foaming agent should preferably be maintained between 0.0001 and 1 part by weight per 100 parts by weight of the monomer, or monomer mixture. If the amount of anti-foaming agent used is too large, it can have a deleterious influence on the quality of the product polymer. Consequently, the total amount of anti-foaming agent added, including that added with the high pressure water and that added through the separate addition pipe (and any added prior to the commencement of polymerization) should be adjusted so that it falls within the range listed above.

The method of producing vinyl chloride polymers described in this invention involves reaction under the same conditions as typical vinyl chloride polymer production methods, with the exception that, as described above, the high pressure water is discharged from linearly discharging nozzles into the polymerization vessel to break up the foam layer generated on the upper surface of the content inside the vessel (sometimes with the use of an anti-foaming agent), at the polymerization step, at the unreacted monomer recovery step, or at both of these steps. That is, the introduction to the polymerization vessel, of the vinyl chloride monomer, or the mixture of monomers containing vinyl chloride monomer, a suspending agent, a polymerization initiator, and an aqueous medium, is conducted in the standard way, with the polymerization conditions also being the same as those for current polymerization reactions.

The monomer employed in the method of producing vinyl chloride polymers described in this invention can be either vinyl chloride monomer, or alternatively, a mixture of monomers containing vinyl chloride monomer as the main constituent (50% by weight or more) but also containing one or more other vinyl monomers (comonomers) which are capable of copolymerization with the vinyl chloride monomer. Examples of suitable comonomers include vinyl esters such as vinyl acetate and vinyl propanoate; acrylic acid esters and methacrylic acid esters such as methyl acrylate and ethyl acrylate; olefins such as ethylene and propylene; vinyl ethers such as lauryl vinyl ether and isobutyl vinyl ether; maleic anhydride; acrylonitrile; styrene; vinylidene chloride; and other monomers which can copolymerize with vinyl chloride, and these comonomers can be used individually or in mixtures of two or more thereof.

There are no particular restrictions on the suspending agent mentioned above, provided it is one of those suspending agents normally used in polymerization reactions of vinyl chloride monomer in an aqueous medium, and suitable examples include water-soluble cellulose ethers such as methyl cellulose, ethyl cellulose, hydroxyethyl cellulose, hydroxypropyl cellulose and hydroxypropyl methyl cellulose; acrylic acid polymer; water-soluble polymers such as gelatin; water- or oil-soluble partially saponified polyvinyl alcohols; oil-soluble emulsifiers such as sorbitan monolaurate, sorbitan trioleate, sorbitan monostearate, glycerin tristearate and ethylene oxidepropylene oxide block copolymer; water-soluble emulsifiers such as polyoxyethylene sorbitan monolaurate, polyoxyethylene glycerin oleate and sodium lauryl sulfate; calcium carbonate; calcium phosphate; and sodium dodecyl benzenesulfonate, and these suspending agents can be used individually or in mixtures of two or more thereof.

The amount of suspending agent added is normally 0.01 to 0.3 part by weight, per 100 parts by weight of the monomer (or monomer mixture) in the polymerization vessel, with 0.02 to 0.2 part by weight being preferable.

The polymerization initiator employed can be any of the water-soluble or oil-soluble polymerization initiators currently used in the production of vinyl chloride polymers. Examples of suitable oil-soluble polymerization initiators include percarbonate compounds such as diisopropyl peroxydicarbonate, di-2-ethylhexyl peroxydicarbonate and diethoxyethyl peroxydicarbonate; perester compounds such as t-butyl peroxyneodecanoate, t-butyl peroxypivalate, t-hexyl peroxypivalate, α-cumyl peroxyneodecanoate, and 2,4,4-trimethylpentyl-2-peroxy-2-neodecanoate; peroxide compounds such as acetylcyclohexylsulfonyl peroxide, 2,4,4-trimethylpentyl-2-peroxyphenoxy acetate, 3,5,5-trimethylhexanoyl peroxide, and lauroyl peroxide; and azo compounds such as azo bis-2,4-dimethyl valeronitrile, and azobis(4-methoxy-2,4-dimethylvaleronitrile). Examples of suitable water-soluble polymerization initiators include potassium persulfate, hydrogen peroxide, and cumene hydroperoxide. These polymerization initiators can be used individually or in mixtures of 2 or more thereof. The amount of polymerization initiator added is normally 0.01 to 0.5 part by weight per 100 parts by weight of the monomer (or monomer mixture) in the polymerization vessel, with 0.02 to 0.3 parts by weight being preferable.

An example of a suitable aqueous medium is deionized water, and this is normally added into the polymerization vessel in an amount of 80 to 300 parts by weight per 100 parts by weight of the monomer (or monomer mixture), with 110 to 200 parts by weight being preferable.

With the method of producing vinyl chloride polymers described in the present invention, polymerization-degree adjusters, chain transfer agents, pH regulators, gelling improvers, anti-static agents, crosslinking agents, stabilizers, fillers, anti-oxidants, buffers, and scale preventive agents which are suitable for use in the production of vinyl chloride polymers may also be added into the polymerization vessel as required.

With regard to the polymerization conditions, the polymerization temperature is normally in the range of 30° to 70° C., the polymerization pressure normally in the range of 3 to 12 kg/cm$^2$, and the polymerization time normally in the range of about 3 to 6 hours.

EXAMPLES

The present invention is outlined in more detail below with reference to working examples and comparative examples. It should be noted however that the present invention is in no way limited to the working examples given below.

[Examples 1–5]

These examples employed, as shown in FIG. 1, a polymerization vessel 6 made of a stainless steel having a 2 m$^3$ internal capacity, equipped with a reflux condenser 7, a stirrer 8, and a jacket 9, and with a linearly discharging nozzle 1 [internal diameter (d) of the discharge portion (1B) of the nozzle: shown in Table 1, ratio of the length L of the discharge portion 1B to the internal diameter d of the nozzle: shown in Table 1, number of nozzles: 1] fitted in the gaseous phase section 14 of the vessel. In this polymerization vessel was placed 900 kg of deionized water, 390 g of partially saponified polyvinyl alcohol and 420 g of t-butyl peroxyneodecanoate. Following evacuation of the polymerization vessel, 600 kg of vinyl chloride monomer was then added. Next, with the content inside the polymerization being stirred constantly, heated water was passed through the jacket, and the temperature of the content was raised to initiate polymerization. After a period of 60 minutes (temperature of the content: 57° C.) the reflux condenser was operated, and heat removal from the content was initiated (heat removal rate: 150 Mcal/hour).

Simultaneously with the operation of the reflux condenser, high pressure water was discharged to the content from the nozzle located in the gaseous phase section of the polymerization vessel, under the conditions shown in Table 1. The intermittent discharging method referred to in Table 1, refers to a method whereby discharging of high pressure water was commenced at the same time as the reflux condenser was operated, and discharging was then continued for one minute, and then halted for 9 minutes, with this 1 minute discharging—9 minute halt cycle being repeated until the polymerization reaction was stopped.

When the internal pressure of the polymerization vessel dropped to 6.0 kg/cm$^2$ (gauge pressure), the polymerization reaction was halted, any unreacted monomer recovered, and the vinyl chloride polymer removed from the polymerization vessel as a slurry. The water was then removed from this polymer slurry, and subsequent drying yielded a powdered vinyl chloride polymer.

[Comparative Example 1]

Polymerization was carried out in the same way as that described in Example 1, with the exception that no high pressure water discharging was conducted, and a powdered vinyl chloride polymer was obtained.

[Comparative Example 2]

Polymerization was carried out in the same way as that described in Example 1, with the exception that the pressure of the high pressure water was reduced from 300 kg/cm$^2$ to 10 kg/cm$^2$, and a powdered vinyl chloride polymer was obtained.

[Examples 6–8]

Polymerization was carried out in the same way as that described in Example 5, with the exceptions that the anti-foaming agents listed in Table 2 were added to the high pressure water, and the internal diameter of the discharge portion of the linearly discharging nozzle was reduced to 0.6 mm, and a powdered vinyl chloride polymer was obtained.

[Example 9]

Polymerization was carried out in the same way as that described in Example 6, with the exception that no anti-foaming agents were added to the high pressure water, and a powdered vinyl chloride polymer was obtained.

[Examples 10–12]

Polymerization was carried out in the same way as that described in Example 6, with the exception that the anti-foaming agents listed in Table 3 were not added to the high pressure water, but were instead added directly to the inside of the polymerization vessel via the anti-foaming agent addition pipe 10 shown in FIG. 1, at the same time as the high pressure water discharging (intermittent addition), and in the amounts shown in Table 3, and a powdered vinyl chloride polymer was obtained.

from the polymerization vessel, the internal section of the polymerization vessel which corresponds to the gaseous phase section at the polymerization reaction was investigated for the remains of splashed polymer, and evaluated by the following judgment criteria. The results are shown in Tables 1, 2 and 3.

Judgment Criteria

○ . . . No splashing of polymer was observed on the inner wall of the gaseous phase section of the polymerization vessel.

Δ . . . A small amount of splashed polymer was observed on the inner wall of the gaseous phase section of the polymerization vessel.

× . . . Large amounts of splashed polymer was observed on the inner wall of the gaseous phase section of the polymerization vessel, and also on the inner wall of the reflux condenser.

TABLE 1

| | Pressure of high pressure water (kg/cm$^2$) | Flow rate of high pressure water (l/min) | Discharging method of high pressure water | Internal diameter of discharge portion of nozzle (mm) | L/d ratio of nozzle | Evaluation |
|---|---|---|---|---|---|---|
| Example 1 | 300 | 10 | intermittent discharging | 1.0 | 3.0 | ○ |
| Example 2 | 200 | 10 | intermittent discharging | 1.1 | 3.0 | ○ |
| Example 3 | 150 | 10 | intermittent discharging | 1.2 | 3.0 | ○ |
| Example 4 | 100 | 10 | intermittent discharging | 1.3 | 3.0 | ○ |
| Example 5 | 50 | 10 | intermittent discharging | 1.5 | 3.0 | ○ |
| Comparative Example 1 | — | — | — | — | — | X |
| Comparative Example 2 | 10 | 10 | intermittent discharging | 2.2 | 3.0 | X |

TABLE 2

| | Pressure of high pressure water (kg/cm$^2$) | Flow rate of high pressure water (l/min) | Discharging method of high pressure water | Total amount of high pressure water discharged(*) | Total amount of anti-foaming agent used(*) | Type of anti-foaming agent | Evaluation |
|---|---|---|---|---|---|---|---|
| Example 6 | 50 | 1 | intermittent discharging | 3 parts by weight | 1 part by weight | anti-foaming agent 1 | ○ |
| Example 7 | 50 | 1 | intermittent discharging | 3 parts by weight | 0.01 parts by weight | anti-foaming agent 2 | ○ |
| Example 8 | 50 | 1 | intermittent discharging | 3 parts by weight | 0.01 parts by weight | anti-foaming agent 3 | ○ |
| Example 9 | 50 | 1 | intermittent discharging | 3 parts by weight | none | none | Δ |

In Examples 1–12 and Comparative Examples 1 and 2 described above, following removal of the polymer slurry In Table 2, (*) refers to the amount of material used by weight, per 100 parts by weight of monomer. Anti-foaming agent 1 refers to methanol, anti-foaming agent 2 to a silicone-based anti-foaming agent [KM-72A (tradename) produced by Shin-Etsu Chemical Co., Ltd.], and anti-foaming agent 3 to an acetylene alcohol-based anti-foaming agent [Surfynol 104 (tradename) produced by Nisshin Kagaku Co.].

TABLE 3

| | Pressure of high pressure water (kg/cm²) | Flow rate of high pressure water (l/min) | Discharging method of high pressure water | Total amount of high pressure water discharged(*) | Total amount o anti-foaming agent used(*) | Type of anti-foaming agent | Evaluation |
|---|---|---|---|---|---|---|---|
| Example 10 | 50 | 1 | intermittent discharging | 3 parts by weight | 0.01 parts by weight | anti-foaming agent 2 | ○ |
| Example 11 | 50 | 1 | intermittent discharging | 3 parts by weight | 0.01 parts by weight | anti-foaming agent 3 | ○ |
| Example 12 | 50 | 1 | intermittent discharging | 3 parts by weight | 0.01 parts by weight | anti-foaming agent 4 | ○ |

In Table 3, (*), anti-foaming agents 2 and 3 are as described above for Table 2. Anti-foaming agent 4 is a polyether based anti-foaming agent [SN defoamer 777 (brand name) produced by Sannopco Co.].

[Example 13]

Using the same conditions outlined in Example 1, three consecutive batches of polymerization reactions were conducted, and fish eyes in the finally obtained polymer powder were measured using the method outlined below. The results are shown in Table 4.

Fish eyes

A mixture consisting of 100 parts by weight of the product polymer, 1 part by weight of tribasic lead sulfate, 1.5 parts by weight of lead stearate, 0.2 part by weight of titanium dioxide, 0.1 part by weight of carbon black, and 50 parts by weight of DOP was kneaded for 3 minutes on a 145° C. roll. The mixture was then formed into a sheet of thickness 0.2 mm, and the number of transparent particles per 100 cm² of the sheet was counted. thickness 0.2 mm, and the number of transparent particles per 100 cm² of the sheet was counted.

[Examples 14–15, Comparative Example 3]

The polymer powders were produced in the same manner as that described in Example 13, with the exception that the actual polymerization reactions were conducted using the same conditions as those outlined in Examples 7 and 11 and Comparative Example 1 respectively, rather than those of Example 1. The polymer powders thus obtained were then measured for fish eyes. The results are shown in Table 4.

TABLE 4

| | Number of fish eyes |
|---|---|
| Example 13 | 6 |
| Example 14 | 4 |
| Example 15 | 7 |
| Comparative Example 3 | 54 |

[Examples 16–20]

These Examples employed, as shown in FIG. 2, a polymerization vessel 6 made of a stainless steel having a 2 m³ internal capacity, equipped with a reflux condenser 7, a stirrer 8, and a jacket 9, and with a linearly discharging nozzle 1 [internal diameter (d) of discharge portion (1B): shown in Table 5, ratio of the length L of the discharge portion 1B to the internal diameter d of the nozzle: shown in Table 5, number of nozzles: 1] fitted in the gaseous phase section 14 of the vessel. The polymerization vessel 6 was also fitted with an unreacted monomer recovery piping arrangement 15 at the top of the gaseous phase section of the vessel. In this polymerization vessel was placed 900 kg of deionized water, 390 g of partially saponified polyvinyl alcohol and 420 g of t-butyl peroxyneodecanoate. Following evacuation of the polymerization vessel, 600 kg of vinyl chloride monomer was then added. Next, with the content inside the polymerization being stirred constantly, heated water was passed through the jacket, and the temperature of the reaction mixture was raised to 57° C. Polymerization was conducted with the temperature of the reaction mixture maintained at a constant 57° C., and when the internal pressure of the polymerization vessel dropped to 6.0 kg/cm² (gauge pressure), the polymerization reaction was halted.

Next, any unreacted monomer was recovered from the polymerization vessel 6 using the unreacted monomer recovery piping arrangement 15, described above. This unreacted monomer recovery was conducted under conditions that gave a space linear velocity of 0.15 m/s. Furthermore, high pressure water discharging from the nozzle 1 was commenced simultaneously with the start of this unreacted monomer recovery, using the conditions outlined in Table 5. The continuous discharging mentioned in the high pressure water discharging method column of Table 5 refers to continuous discharging of high pressure water, from the time the unreacted monomer recovery was begun, until its completion. Following the recovery of the unreacted monomer under these high pressure water discharging conditions, the vinyl chloride polymer was removed from the polymerization vessel as a slurry. The water was then removed from this polymer slurry, and subsequent drying yielded a powdered vinyl chloride polymer.

[Comparative Example 4]

Polymerization was carried out in the same way as that described in Example 16, with the exception that no high pressure water discharging was conducted at the unreacted monomer recovery step, and a powdered vinyl chloride polymer was obtained.

[Comparative Example 5]

Polymerization was carried out in the same way as that described in Example 16, with the exception that the pressure of the high pressure water was reduced from 300 kg/cm² to 10 kg/cm², and a powdered vinyl chloride polymer was obtained.

[Examples 21–23]

Polymerization was carried out in the same way as that described in Example 20, with the exceptions that the anti-foaming agents listed in Table 6 were added to the high pressure water, the internal diameter of the discharge portion of the nozzle was reduced to 0.6 mm, and the discharging was conducted intermittently following the method described below, as opposed to the previous continuous discharging method, and a powdered vinyl chloride polymer was obtained.

Intermittent discharging

The high pressure water discharging was commenced simultaneously with the commencement of the unreacted monomer recovery step, continued for 1 minute, and then halted for 1 minute. This 1 minute discharging—1 minute rest cycle was continued until the monomer recovery step was completed.

[Example 24]

Polymerization was carried out in the same way as that described in Example 21, with the exception that no anti-foaming agent was added to the high pressure water, and a powdered vinyl chloride polymer was obtained.

[Examples 25–27]

Polymerization was carried out in the same way as that described in Example 21, with the exception that the anti-foaming agents listed in Table 7 were not added to the high pressure water, but were instead added directly to the inside of the polymerization vessel via the anti-foaming agent addition pipe 10 shown in FIG. 2, at the same time as the high pressure water discharging (intermittent addition), and in the amounts shown in Table 7, and a powdered vinyl chloride polymer was obtained.

In Examples 16–27 and Comparative Examples 4 and 5 described above, following removal of the polymer slurry from the polymerization vessel, the internal section of the polymerization vessel which corresponds to the gaseous phase section at the polymerization reaction was investigated for the remains of splashed polymer, and the splashed polymer was evaluated using the judgment criteria described for Examples 1–12. The results are shown in Tables 6–8.

TABLE 5

| | Pressure of high pressure water (kg/cm²) | Flow rate of high pressure water (l/min) | Discharging method of high pressure water | Internal diameter of discharge portion of nozzle (mm) | L/d ratio of nozzle | Evaluation |
|---|---|---|---|---|---|---|
| Example 16 | 300 | 10 | continuous discharging | 1.0 | 3.0 | ○ |
| Example 17 | 200 | 10 | continuous discharging | 1.1 | 3.0 | ○ |
| Example 18 | 150 | 10 | continuous discharging | 1.2 | 3.0 | ○ |
| Example 19 | 100 | 10 | continuous discharging | 1.3 | 3.0 | ○ |
| Example 20 | 50 | 10 | continuous discharging | 1.5 | 3.0 | ○ |
| Comparative Example 4 | — | — | — | — | — | X |
| Comparative Example 5 | 10 | 10 | continuous discharging | 2.2 | 3.0 | X |

TABLE 6

| | Pressure of high pressure water (kg/cm²) | Flow rate of high pressure water (l/min) | Discharging method of high pressure water | Total amount of high pressure water discharged(*) | Total amount of anti-foaming agent used(*) | Type of anti-foaming agent | Evaluation |
|---|---|---|---|---|---|---|---|
| Example 21 | 50 | 1 | intermittent discharging | 0.5 parts by weight | 0.5 part by weight | anti-foaming agent 1 | ○ |
| Example 22 | 50 | 1 | intermittent discharging | 0.5 parts by weight | 0.01 parts by weight | anti-foaming agent 2 | ○ |
| Example 23 | 50 | 1 | intermittent discharging | 0.5 parts by weight | 0.01 parts by weight | anti-foaming agent 3 | ○ |
| Example 24 | 50 | 1 | intermittent discharging | 0.5 parts by weight | none | none | Δ |

In Table 6, (*) refers to the amount of material used by weight per 100 parts by weight of monomer. Anti-foaming agent 1 refers to methanol, anti-foaming agent 2 to a silicone-based anti-foaming agent [KM-72A (tradename) produced by Shin-Etsu Chemical Co. Ltd.], and anti-foaming agent 3 to an acetylene alcohol-based anti-foaming agent Surfynol 104 (tradename) produced by Nisshin Kagaku Co.].

TABLE 7

|  | Pressure of high pressure water (kg/cm²) | Flow rate of high pressure water (l/min) | Discharging method of high pressure water | Total amount of high pressure water discharged(*) | Total amount of anti-foaming agent used(*) | Type of anti-foaming agent | Evaluation |
|---|---|---|---|---|---|---|---|
| Example 25 | 50 | 1 | intermittent discharging | 0.5 part by weight | 0.01 part by weight | anti-foaming agent 2 | ○ |
| Example 26 | 50 | 1 | intermittent discharging | 0.5 part by weight | 0.01 part by weight | anti-foaming agent 3 | ○ |
| Example 27 | 50 | 1 | intermittent discharging | 0.5 part by weight | 0.01 part by weight | anti-foaming agent 4 | ○ |

In Table 7, (*), anti-foaming agents 2 and 3 are as described above for Table 6. Anti-foaming agent 4 is a polyether-based anti-foaming agent [SN defoamer 777 (tradename) produced by Sannopco Co.].

[Example 28]

Using the same conditions outlined in example 16, three consecutive batches of polymerization reactions were conducted, and the number of fish eyes in the finally obtained polymer powder measured using the method outlined for Example 13. The results are shown in Table 8.

[Examples 29–30, Comparative Example 6]

The polymer powders were produced in the same manner as that described in Example 28, with the exception that the actual polymerization reactions were conducted using the same conditions as those outlined in Examples 22 and 26 and Comparative Example 4 respectively, rather than those of Example 16. The polymer powders thus obtained were then measured for fish eyes. The results are shown in Table 8.

|  | Number of fish eyes |
|---|---|
| Example 28 | 8 |
| Example 29 | 5 |
| Example 30 | 6 |
| Comparative Example 6 | 40 |

[Example 31]

This Example employed, as shown in FIG. 3, a polymerization vessel 6 made of a stainless steel (80 m³ internal capacity), equipped with a reflux condenser 7, a stirrer 8, and a jacket 9, and with a foam sensor 3A, a foam sensor 3B located 10 cm above the sensor 3A, and a ring pipe arrangement 2 to which were fitted linearly discharging nozzles 1 (number of nozzles: 4), all fitted in the gaseous phase section of the vessel. The linearly discharging nozzles 1 were a linearly discharging nozzle as shown in FIG. 4, with an orifice diameter d (here, corresponding to the internal diameter d of the discharge portion 1B) of 2.08 mm, and with a ratio of the length L of the discharge portion 1B to the orifice diameter d (L/d) of 3.0. Furthermore, the foam sensors 3A and 3B were electrostatic capacity sensors.

In this stainless steel polymerization vessel 6 was placed 39 t of deionized water, 10.1 kg of partially saponified polyvinyl alcohol and a 6% by weight aqueous solution of hydroxypropyl methyl cellulose (equivalent to 6.7 kg of hydroxypropyl methyl cellulose). Following evacuation of the polymerization vessel until the pressure inside had fallen to 50 mmHg (absolute pressure), 28 t of the vinyl chloride monomer was added. Next, with the content inside the polymerization vessel being stirred constantly, the polymerization reaction was initiated by introducing 12.6 kg of t-butyl peroxyneodecanoate and 7.0 kg of cumyl peroxydecanoate into the polymerization vessel under pressure, and simultaneously passing heated water through the jacket to raise the temperature of the content. When the temperature of the content reached the pre-set polymerization temperature of 56° C., cooling of the content was commenced by passing cooling water through the jacket.

(1) High pressure water discharging at operation of the reflux condenser

When the polymerization conversion reached 5%, cooling water was passed through the reflux condenser, commencing the process of heat removal from the content of the polymerization vessel. The rate of heat removal by the reflux condenser was increased as the polymerization reaction proceeded, to a maximum of 1600 Mkal/hr. At the point where the polymerization conversion reached 65%, the sensor 3A detected the presence of foam. One minute after this detection of foam by the sensor 3A, high pressure water discharging [pressure: 100 kg/cm²] from the linearly discharging nozzles 1 was commenced (In Table 9, the pressure of the high pressure water is listed as the discharge pressure. Hereafter all tables follow this labeling convention). Within 1 minute of the commencement of high pressure water discharging, the foam had broken up, and even sensor 3A could no longer detect the presence of any foam. The high pressure water discharging was continued from this point, without interruption until the polymerization was completed (In Table 9 this is referred to as continuous discharging. This labeling convention is also followed in Table 11 below).

(2) High pressure water discharging at recovery of the unreacted monomer

When the pressure inside the polymerization vessel had fallen to 6.0 mmHg (absolute pressure) a polymerization stopper was introduced into the vessel under pressure, to terminate the polymerization reaction. Recovery of the unreacted monomer was then commenced via the polymerization vessel recovery pipe 15 (recovery rate: 60 Nm³/min). Ten minutes after the commencement of monomer recovery, the foam sensor 3A detected the presence of foam. One minute after this detection of foam by the sensor 3A, high pressure water discharging [pressure: 100 kg/cm²] from the linearly discharging nozzles 1 was commenced. Within 30 seconds of the commencement of high pressure water discharging, the foam had broken up, and even sensor 3A could no longer detect the presence of any foam. The high pressure water discharging was continued from this point, without interruption until the recovery of unreacted monomer was completed (In Table 9 this is referred to as continuous discharging. The same labeling convention is also used in Table 12 below).

Following recovery of the unreacted monomer, the vinyl chloride polymer was removed from the polymerization vessel as a slurry. The internal surface of the polymerization vessel was then visually inspected, and the amount of splashed polymer on the inner wall of the vessel was evaluated using the following criteria. The results are shown in Table 9.

Evaluation criteria

○ . . . No splashing of polymer was observed on the inner wall of the gaseous phase section of the polymerization vessel.

× . . . Large amounts of splashed polymer was observed on the inner wall of the gaseous phase section of the polymerization vessel, and also on the inner wall of the reflux condenser.

×× . . . Large amounts of splashed polymer was observed on the inner wall of the gaseous phase section of the polymerization vessel and the inner wall of the reflux condenser, and also inside the unreacted monomer recovery line.

The water was then removed from the polymer slurry, and the slurry was dried to give a powdered vinyl chloride polymer. The number of fish eyes in the polymer product thus obtained was counted via the method outlined in Example 13. The results are shown in Table 9.

Next, a batch polymerization was carried out, in exactly the same way as the polymerization above, with the exception that the polymerization vessel was used immediately following the removal of the product polymer above. The number of imperfections in 100 g of the powdered vinyl chloride polymer obtained from the batch polymerization was then measured. The results are shown in Table 9.

[Examples 32 and 33]

Polymerization was carried out in the same way as that described in Example 31, with the exceptions that the nozzles used, the number of nozzles, the pressure of the high pressure water, the total volume of water discharged, and the discharging times for (1) the high pressure water discharging conducted at the reflux condenser operation, and (2) the high pressure water discharging conducted at the unreacted monomer recovery, were set as shown in Table 9. Following removal of the polymer, the amount of polymer splashed over the inner wall of the polymerization vessel, the number of imperfections in the product polymer, and the number of fish eyes present in formed items manufactured from the polymer were evaluated in the same manner as described in Example 31. The results are shown in Table 9.

TABLE 9

|  | Example 31 | Example 32 | Example 33 |
|---|---|---|---|
| Nozzle |  |  |  |
| Type | Linearly discharging nozzle | Linearly dischargimg nozzle | Linearly discharging nozzle |
| Orifice diameter (mm) | 2.08 | 3.30 | 1.70 |
| Number of nozzles | 4 | 2 | 6 |
| L/d ratio | 3.0 | 3.0 | 3.0 |
| Discharging at condenser operation |  |  |  |
| Maximum heat removal rate (Mcal/hr) | 1600 | 1600 | 1600 |

TABLE 9-continued

|  | Example 31 | Example 32 | Example 33 |
|---|---|---|---|
| Polymerization conversion (%) at foam detection (sensor 3A) | 65 | 65 | 65 |
| Discharge pressure (kg/cm$^2$) | 100 | 80 | 140 |
| Discharging method | continuous discharging | continuous discharging | continuous discharging |
| Total volume of water discharged (m$^3$) | 3.7 | 3.9 | 4.3 |
| Discharging time | 35 min | 34 min | 34 min |
| Discharging at unreacted monomer recovery |  |  |  |
| Monomer recovery rate (Nm$^3$/min) | 60 | 60 | 60 |
| Time elapsed since monomer recovery commencement at foam detection (sensor 3A) | 5 min | 5 min | 5 min |
| Discharge pressure (kg/cm$^2$) | 100 | 80 | 140 |
| Discharging method (discharging repetitions) | continuous discharging | continuous discharging | continuous discharging |
| Total volume of water discharged (m$^3$) | 2.2 | 2.3 | 2.5 |
| Discharging time | 20 min | 20 min | 20 min |
| Splashing of polymer over the gaseous phas section etc., of the vessel | ○ | ○ | ○ |
| Fish eyes (number) | 3 | 2 | 4 |
| Imperfections (number) | 6 | 8 | 6 |

In Table 9, the discharge pressure refers to the gauge pressure measured at the pump discharge outlet.

[Examples 34–39]

Polymerization was carried out in the same way as that described in Example 31, with the exceptions that the discharging processes were conducted as described in (1) and (2) below.

(1) High pressure water discharging at operation of the reflux condenser

This discharging process was carried out in the same way as that described in Example 31 with the exceptions that the nozzles used, the number of nozzles, the pressure of the high pressure water, the total volume of water discharged, and the discharging times were set as shown in Table 10, and that instead of continuous discharging, the intermittent discharging method detailed below was used. In Example 37, forty five seconds after commencing the first discharging of this discharging process, the foam sensor 3A could no longer detect any foam. In Example 38, seventy five seconds after commencing the first discharging, the foam sensor 3A could no longer detect any foam. In Example 39, two minutes after commencing the first discharging, the foam sensor 3A could no longer detect any foam.

Intermittent discharging

High pressure water discharging was commenced one minute after the foam sensor 3A detected foam, and even if foam detection by the foam sensor 3A ceased, the discharging was continued for a period of two minutes and then halted. When the foam sensor 3A re-detected the presence of foam, the above procedure was repeated with discharging commencing one minute after the detection. This cycle of discharging—halt of discharging was repeated until the polymerization was completed.

(2) High pressure water discharging at the unreacted monomer recovery step

This discharging process was carried out in the same way as that described in Example 31 with the exceptions that the pressure of the water, the total volume of water discharged, and the discharging times were set as shown in Table 10, and that instead of continuous discharging, the intermittent discharging method detailed above was used. In Example 37, twenty seconds after commencing the first discharging of this discharging process, the foam the sensor 3A could no longer detect any foam. In Example 38, forty seconds after commencing the first discharging of this process, the foam sensor 3A could no longer detect any foam. In Example 39, one minute after commencing the first discharging of this process, the foam sensor 3A could no longer detect any foam.

Following recovery of the unreacted monomer, the polymer was removed from the polymerization vessel, and the amount of polymer splashed over the inner wall of the polymerization vessel, the number of imperfections in the product polymer, and the number of fish eyes present in formed items manufactured from the polymer were evaluated in the same manner as described in Example 31. The results are shown in Table 10.

TABLE 10

|  | Example 34 | Example 35 | Example 36 | Example 37 | Example 38 | Example 39 |
|---|---|---|---|---|---|---|
| Nozzle | | | | | | |
| Type | Linearly discharging nozzl | Linearly discharging nozzle | Linearly discharging nozzle | Linearly discharging nozzle | Linearly discharging nozzle | Linearly discharging nozzle |
| Orifice diameter (mm) | 2.08 | 330 | 1.70 | 2.08 | 2.08 | 2.08 |
| Number of nozzles | 4 | 2 | 6 | 4 | 4 | 4 |
| L/d ratio | 3.0 | 3.0 | 3.0 | 5.0 | 1.5 | 3.0 |
| Discharging at condenser operation | | | | | | |
| Maximum heat removal rate (Mcal/hr) | 1600 | 1600 | 1600 | 1600 | 1600 | 1600 |
| Polymerization conversion (%) at time of foam detection (sensor 3A) | 65 | 65 | 65 | 65 | 65 | 65 |
| Discharge pressure (kg/m$^2$) | 100 | 80 | 140 | 100 | 100 | 50 |
| Discharging method (discharging repetitions) | intermittent discharging (7 times) | intermittent discharging (8 times) | intermittent discharging (8 times) | intermittent discharging (6 times) | intermittent discharging (8 times) | intermittent discharging (15 times) |
| Total volume of water discharged (m$^3$) | 1.5 | 1.8 | 2.0 | 1.3 | 1.7 | 2.3 |
| Discharging time | 2 min × 7 | 2 min × 8 | 2 min × 8 | 2 min × 6 | 2 min × 8 | 2 min × 1 |
| Monomer recovery rate (Nm$^3$/min) | 60 | 60 | 60 | 60 | 60 | 60 |
| Discharging at unreacted monomer recovery | | | | | | |
| Time elapsed since monomer recovery commencement at foam detection (sensor 3A) | 5 min | 5 min | 5 min | 5 min | 5 min | 5 min |
| Discharge pressure (kg/m$^2$) | 100 | 80 | 140 | 100 | 100 | 50 |
| Discharging method (discharging repetitions) | intermittent discharging (5 times) | intermittent discharging (6 times) | intermittent discharging (6 times) | intermittent discharging (5 times) | intermittent discharging (6 times) | intermittent discharging (8 times) |
| Total volume of water discharged (m$^3$) | 1.1 | 1.4 | 1.5 | 1.1 | 1.3 | 1.2 |
| Discharging time | 2 min × 5 | 2 min × 6 | 2 min × 6 | 2 min × 5 | 2 min × 6 | 2 min × 8 |
| Splashing of polymer over the gaseous phase section etc., of the vessel | ○ | ○ | ○ | ○ | ○ | ○ |
| Fish eyes (number) | 2 | 3 | 2 | 2 | 4 | 6 |
| Imperfections (number) | 7 | 8 | 9 | 6 | 9 | 10 |

In Table 10, the discharge pressure refers to the gauge pressure measured at the pump discharge outlet.

[Comparative Examples 7–11]

(1) High pressure water discharging at operation of the reflux condenser

This discharging process was carried out in the same way as that described in Example 31 with the exceptions that the nozzles used, the number of nozzles, the total volume of water discharged, and the discharging times were set as shown in Table 11. The high pressure water discharging angles for the full cone nozzles, the flat nozzles and the hollow cone nozzles were 30 degrees [discharging conditions: discharging at atmospheric pressure, discharging pressure 50 kg/cm$^2$ (guage pressure)]. The result for Comparative Example 7 was that three minutes after commencing discharging, foam was already detected by the foam sensor 3B, and this foam continued to be detected thereafter. Comparative Example 8 gave a similar result with foam being continuously detected by the foam sensor 3B five minutes after commencing discharging. Comparative Example 9 also gave a similar result with foam being continuously detected by the foam sensor 3B six minutes after commencing discharging. Comparative Example 10 also gave a similar result with foam being continuously detected by the foam sensor 3B five minutes after commencing discharging. Comparative Example 11 also gave a similar result with foam being continuously detected by the foam sensor 3B three minutes after commencing discharging.

(2) High pressure water discharging at the unreacted monomer recovery step

When in Example 31, the recovery rate of the unreacted monomer was changed from 60 $Nm^3/min$ to 30 $Nm^3/min$, the foam sensor 3A did not detect any foam until after recovery of the unreacted monomer. Hence high pressure water discharging was not carried out.

Following recovery of the unreacted monomer, the polymer was removed from the polymerization vessel, and the amount of polymer splashed over the inner wall of the polymerization vessel, the number of imperfections in the product polymer, and the number of fish eyes present in formed items manufactured from the polymer were evaluated in the same manner as described in Example 31. The results are shown in Table 11.

TABLE 11

|  | Comparative Example 7 | Comparative Example 8 | Comparative Example 9 | Comparative Example 10 | Comparative Example 11 |
|---|---|---|---|---|---|
| Nozzle |  |  |  |  |  |
| Type | full cone nozzle | full cone nozzle | flat nozzle | flat nozzle | hollow cone nozzle |
| Orifice diameter (mm) | 2.30 | 3.60 | 2.16 | 3.30 | 3.60 |
| Number of nozzles | 4 | 4 | 4 | 2 | 2 |
| L/d ratio | — | — | — | — | — |
| Discharging at condenser operation |  |  |  |  |  |
| Maximum heat removal rate (Mcal/hr) | 1600 | 1600 | 1600 | 1600 | 1600 |
| Polymerization conversion (%) at foam detection (sensor 3A) | 65 | 65 | 65 | 65 | 65 |
| Discharge pressure (kg/cm$^2$) | 100 | 100 | 100 | 100 | 100 |
| Discharging method | continuous discharging | continuous discharging | continuous discharging | continuous discharging | continuous discharging |
| Total volume of water discharged (m$^3$) | 3.3 | 7.4 | 3.9 | 4.4 | 4.2 |
| Discharging time | 35 min | 34 min | 35 min | 35 min | 35 min |
| Discharging at unreacted monomer recovery |  |  |  |  |  |
| Monomer recovery rate (Nm$^3$/min) | 30 | 30 | 30 | 30 | 30 |
| Time elapsed since monomer recovery commencement at foam detection (sensor 3A) | — | — | — | — | — |
| Discharge pressure (kg/cm$^2$) | — | — | — | — | — |
| Discharging method (discharging repetitions) | — | — | — | — | — |
| Total volume of water discharged (m$^3$) | 0 | 0 | 0 | 0 | 0 |
| Discharging time | 0 | 0 | 0 | 0 | 0 |
| Splashing of polymer over the gaseous phase section etc., of the vessel | X | X | X | X | X |
| Fish eyes (number) | 50 | 80 | 70 | 60 | 65 |
| Imperfections (number) | 30 | 43 | 40 | 35 | 46 |

In Table 11, the discharge pressure refers to the gauge pressure measured at the pump discharge outlet.

[Comparative Examples 12–15]

(1) High pressure water discharging at operation of the reflux condenser

With these Comparative Examples, when the maximum heat removal rate of the reflux condenser of 1600 Mkal/hr in Example 31 was changed to 1000 Mkcal/hr, the foam sensor 3A did not detect any foam up until completion of polymerization. Hence high pressure water discharging was not carried out.

(2) High pressure water discharging at the unreacted monomer recovery step

This discharging process was carried out in the same way as that described in Example 31 with the exceptions that the pressure of the high pressure water, the nozzles used, the number of nozzles, the total volume of water discharged, and the discharging times were set as shown in Table 12. The full cone nozzles, flat nozzles and hollow cone nozzles used were the same as those used in Comparative Examples 7–11. The result for Comparative Example 12 was that five minutes after commencing discharging, foam was already detected by the foam sensor 3B, and this foam continued to be detected thereafter. Comparative Example 13 gave a similar result with foam being continuously detected by the foam sensor 3B eight minutes after commencing discharging. Comparative Example 14 also gave a similar result with foam being continuously detected by the foam sensor 3B five minutes after commencing discharging. Moreover with Comparative Example 14, ten minutes after commencing discharging the recovery pipe 15 was clogged, so that the recovery of unreacted monomer was halted, and the high pressure water discharging was also stopped. Comparative Example 15 also gave a similar result with foam being continuously detected by the foam sensor 3B four minutes after commencing discharging. Moreover with Comparative Example 15, eight minutes after commencing discharging the recovery pipe 15 was clogged, so that the recovery of unreacted monomer was halted, and the high pressure water discharging was also stopped.

Following halting the recovery of the unreacted monomer, the polymer was removed from the polymerization vessel, and the amount of polymer splashed over the inner wall of the polymerization vessel, the number of imperfections in the product polymer, and the number of fish eyes present in formed items manufactured from the polymer were evaluated in the same manner as described in Example 31. The results are shown in Table 12.

TABLE 12

|  | Comparative Example 12 | Comparative Example 13 | Comparative Example 14 | Comparative Example 15 |
|---|---|---|---|---|
| Nozzle |  |  |  |  |
| Type | full cone nozzle | flat nozzle | flat nozzle | flat nozzle |
| Orifice diameter (mm) | 3.60 | 2.16 | 2.16 | 2.16 |
| Number of nozzles | 4 | 4 | 4 | 4 |
| L/d ratio | — | — | — | — |
| Discharging at condenser operation |  |  |  |  |
| Maximum heat removal rate (Mcal/hr) | 1000 | 1000 | 1000 | 1000 |
| Polymerization conversion (%) at foam detection (sensor 3A) | — | — | — | — |
| Discharge pressure (kg/cm$^2$) | — | — | — | — |
| Discharging method | — | — | — | — |
| Total volume of water discharged (m$^3$) | 0 | 0 | 0 | 0 |
| Discharging time | 0 | 0 | 0 | 0 |
| Discharging at unreacted monomer recovery |  |  |  |  |
| Monomer recovery rate (Nm$^3$/min) | 60 | 60 | 60 | 60 |
| Time elapsed since monomer recovery commencement at foam detection (sensor 3A) | 5 | 5 | 5 | 5 |
| Discharge pressure (kg/cm$^2$) | 100 | 100 | 100 | 100 |
| Discharging method (discharging repetitions) | continuous discharging | continuous discharging | continuous discharging | continuous dischargin |
| Total volume of water discharged (m$^3$) | 4.3 | 2.2 | 3.1 | 0.9 |
| Discharging time | 20 min | 20 min | *15 min | *12 min |
| Splashing of polymer over the gaseous phase section etc., of the vessel | XX | XX | XX | XX |
| Fish eyes (number) | 13 | 10 | 9 | 11 |
| Imperfections (number) | 40 | 45 | 50 | 47 |

In Table 12, the discharge pressure refers to the gauge pressure measured at the pump discharge outlet. The discharging times with * indicate the time at which the recovery operation was stopped due to being unable to recover the unreacted monomer.

What is claimed is:

1. A method of producing vinyl chloride polymers, which comprises the steps of subjecting vinyl chloride monomer or a mixture of monomers containing vinyl chloride monomer to suspension polymerization reaction in an aqueous medium in the presence of a suspending agent within a polymerization vessel equipped with a reflux condenser, and subsequently, after the completion of the polymerization reaction, recovering unreacted monomer, said method further comprising discharging a high pressure flow of water through a linear discharging nozzle, at a pressure of 20 kg/cm$^2$ or more, substantially linearly to the surface of a liquid phase inside the polymerization vessel, from a nozzle provided in a gaseous phase section of the polymerization vessel, the discharge pressure and linearity of said water being sufficient to cause said water to penetrate foam on the surface of said liquid and reach the liquid phase underneath, said nozzle comprising a substantially cylindrical water-inlet portion (1A) and a discharge portion (1B) with an internal diameter (d), the ratio (L/d) of the length (L) of the discharge portion (1B) to the internal diameter (d) of the same discharge portion being in the range of 1.0 to 10.0, said substantially linear discharge of high pressure water being conducted at said polymerization step, at said recovery step or at both these steps, whereby foam generated on the surface of the liquid phase is eliminated.

2. The method of claim 1, wherein said high pressure water discharging is carried out at said polymerization step.

3. The method of claim 2, wherein said polymerization is carried out in the presence of an anti-foaming agent.

4. The method of claim 1, wherein said high pressure water discharging is carried out at said recovery step.

5. The method of claim 4, wherein said recovery step is carried out in the state of an anti-foaming agent being present in a reaction mixture inside the polymerization vessel.

6. The method of claim 4, wherein the recovery rate of said unreacted monomer in said recovery step is 40 Nm$^3$/min or more.

7. The method of claim 1, wherein said high pressure water discharging is carried out at both said polymerization step and said recovery step.

8. The method of claim 7, wherein said high pressure water discharging is carried out during operation of the reflux condenser at the polymerization step.

9. The method of claim 7, wherein the recovery rate of said unreacted monomer in said recovery step is 40 Nm$^3$/min or more.

10. The method of claim 1, wherein said high pressure water discharging is started by a detection signal from a foam sensor located in the gaseous phase section of said polymerization vessel, for detecting the presence of foam.

11. The method of claim 10, wherein said high pressure water discharging is carried out at both said polymerization step and said recovery step.

12. The method of claim 11, wherein said high pressure water discharging is carried out during operation of the reflux condenser at the polymerization step.

13. The method of claim 1, wherein the pressure of said high pressure water is from 20~500 kg/cm$^2$.

14. The method of claim 1 wherein the high pressure water is discharged through a plurality of nozzles.

15. The method of claim 1 wherein the pressure of said high pressure water is from 80–150 kg/cm$^2$.

16. The method of claim 12 wherein said water is discharged intermittently in a plurality of discharge-rest cycles during operation of said reflux condenser until the polymerization reaction is stopped.

17. The method of claim 4, wherein said high pressure water discharge is carried out intermittently using a discharge-rest cycle until the monomer recovery step is completed.

* * * * *